(12) United States Patent
Montplaisir et al.

(10) Patent No.: US 8,578,621 B2
(45) Date of Patent: Nov. 12, 2013

(54) DRILL PRESSES HAVING LASER ALIGNMENT SYSTEMS AND METHODS THEREFOR

(75) Inventors: Sarah Jane Montplaisir, Joppa, MD (US); David Andrew Goldman, Phoenix, MD (US)

(73) Assignee: Chang Type Industrial Company, Ltd., Taichung County (TW)

( * ) Notice: Subject to any disclaimer, the term of this patent is extended or adjusted under 35 U.S.C. 154(b) by 777 days.

(21) Appl. No.: 12/822,989

(22) Filed: Jun. 24, 2010

(65) Prior Publication Data

US 2011/0318122 A1    Dec. 29, 2011

(51) Int. Cl.
    *G01B 11/27* (2006.01)
(52) U.S. Cl.
    USPC .......................... 33/638; 33/286; 33/DIG. 21
(58) Field of Classification Search
    USPC ............. 33/286, 628, 638, 639, 642, DIG. 21
    See application file for complete search history.

(56) References Cited

U.S. PATENT DOCUMENTS

| 7,140,118 | B2* | 11/2006 | Adrian | 33/286 |
| 7,430,808 | B2* | 10/2008 | Chen | 33/286 |
| 7,464,478 | B2* | 12/2008 | Adrian | 33/286 |
| 2006/0053643 | A1* | 3/2006 | Adrian | 33/286 |
| 2007/0068020 | A1* | 3/2007 | Adrian | 33/286 |
| 2008/0110036 | A1* | 5/2008 | Chen | 33/286 |
| 2009/0260239 | A1* | 10/2009 | Cerwin | 33/286 |
| 2012/0211951 | A1* | 8/2012 | Montplaisir et al. | 279/141 |

* cited by examiner

*Primary Examiner* — G. Bradley Bennett
(74) *Attorney, Agent, or Firm* — Dority & Manning, P.A.

(57) ABSTRACT

A laser alignment system for a drill press includes first and second adjustable laser assemblies mountable on the drill press. Each adjustable laser assembly includes a base firmly affixed to the drill press, a rotatable element mounted on the base and being adapted to selectively rotate relative to the base, a pivotable element mounted on the rotatable element and being adapted to selectively pivot relative to the rotatable element, and a laser mounted on the pivotable element and being adapted to move simultaneously with the pivotable element. The laser alignment system includes a pivot adjusting mechanism coupled with the pivotable element for selectively pivoting the pivotable element relative to the rotatable element, and a rotation adjusting mechanism coupled with the rotatable element for selectively rotating the rotatable element relative to the base.

23 Claims, 13 Drawing Sheets

DRILL PRESSES HAVING LASER ALIGNMENT SYSTEMS AND METHODS THEREFOR

BACKGROUND OF THE INVENTION

1. Field of the Invention

The present invention is generally related to drill presses and is more specifically related to alignment devices for drill presses.

2. Description of the Related Art

Before using a conventional drilling machine, an operator will draw lines on a work piece to mark the location where a hole will be drilled. The operator must then use a relatively small drill bit to form an impression on the work piece to check whether the drill bit hits the impression at the marked location. When the impression and the marked location are matched, a selected drill bit is installed in the chuck of the drilling machine and aimed at the impression on the work piece. The drilling machine may then be operated to drill the desired hole in the work piece. The above-described process normally takes several attempts to properly align the drill bit with the selected hole location. The procedure is complicated and time-consuming, and the selected hole location frequently does not have a high level of precision.

There have been a number of attempts directed to improving alignment procedure for drilling machines. For example, U.S. Pat. No. 7,146,739 to Ku et al. discloses a laser-guiding coordination device for a drilling machine having a C-base, with two laser-line projectors oppositely and adjustably embedded inside the C-base. Each laser-line projector has a first adjuster, a second adjuster perpendicularly and rotatably mounted inside the first adjuster, and a laser generator provided inside the second adjuster to generate laser lines. By rotating the first and second adjusters, two laser lines projected onto a work piece are moved in parallel or rotated to adjust and to define a precise laser mark without the need for physically drawing lines on the work piece.

U.S. Pat. No. 7,430,808 to Chen discloses a laser alignment device for a drilling machine including a base adapted to be installed in a drilling machine above the worktable of the drilling machine. The base has two through holes, a first laser module mounted in one through hole and operable to emit a first laser beam, and a second laser module, which has a laser emitter mounted in the other through hole and operable to emit a second laser beam from its bottom side. The second laser module has a protruding portion extending around the periphery of the laser emitter and engaging the inside wall of the associated through hole to maintain the laser emitter away from the inside wall of the associated through hole. Setting devices are mounted in the base and are inserted into one through hole to engage the periphery of the laser emitter of the second laser module. The laser alignment device is mounted to a chuck of a drilling machine.

Laser alignment systems for drill presses are typically adjustable by loosening a locking screw and then moving the laser by hand or with a tool such as a screw driver. Once the laser has been properly aimed, the locking screw is re-tightened to hold the laser in position. One drawback associated with conventional laser devices is that alignment adjustments are difficult to make. One extraneous movement may misalign the laser, thereby requiring the user to re-start the alignment process. In addition, with conventional laser alignment devices, as the locking screw is tightened, the locking screw often causes the laser to move out of alignment. This is the source of great frustration for operators, which often causes operators to overcompensate for the misalignment that will occur when tightening the locking screw.

In spite of the above advances, there remains a need for laser alignment systems for drill presses that are easy to use, extremely accurate, and that solve the problems with the prior art systems outlined above.

SUMMARY OF THE INVENTION

In one embodiment, a laser alignment system preferably includes first and second adjustable laser assemblies mountable on a drill press. In one embodiment, each of the adjustable laser assemblies desirably includes a base firmly affixed to the drill press, a rotatable element mounted on the base which is adapted to selectively rotate relative to the base, a pivotable element mounted on the rotatable element which is adapted to selectively pivot relative to the rotatable element, and a laser mounted on the pivotable element and being adapted to move simultaneously with the pivotable element. The laser alignment system preferably includes a pivot adjusting mechanism coupled with the pivotable element for selectively pivoting the pivotable element relative to the rotatable element, and a rotation adjusting mechanism coupled with the rotatable element for selectively rotating the rotatable element relative to the base.

In one embodiment, the pivotable element is preferably adapted to pivot relative to the rotatable element and rotate simultaneously with the rotatable element. The laser is desirably adapted to pivot as the pivotable element pivots relative to the rotatable element and rotate as the rotatable element rotates relative to the base.

In one embodiment, the drill press preferably includes a vertical support column having an upper end and a lower end, a head stock connected with the upper end of the vertical support column, a stand supporting a lower end of the vertical support column, and a table mounted on the vertical support column. The first adjustable laser assembly is preferably mounted to a first side of the headstock for projecting a first laser light onto the table and the second adjustable laser assembly is preferably mounted to a second side of the headstock for projecting a second laser light onto the table.

In one embodiment, each adjustable laser assembly preferably includes a base secured to one of the sides of the headstock, the base including a horizontal flange that lies in a plane that is perpendicular to a longitudinal axis of the vertical support column. In one embodiment, the horizontal flange desirably has a laser aperture extending therethrough, whereby the rotatable element, the pivotable element, and the laser are aligned with the laser aperture.

In one embodiment, the base preferably includes a first rotation flange and the rotatable element includes a second rotation flange. The rotation adjusting mechanism desirably couples the first and second rotation flanges together for selectively changing spacing between the first and second rotation flanges for rotating the rotatable element relative to the base. In one embodiment, the laser preferably rotates within the laser aperture of the base during rotation of the rotatable element. In one embodiment, the second rotation flange has an elongated opening extending in a substantially horizontal direction that enables the rotation adjusting mechanism to slide freely within the elongated opening during rotation of the rotatable element relative to said base.

In one embodiment, the pivotable element preferably includes a first pivot flange and the rotatable element preferably has a second pivot flange, whereby the pivot adjusting mechanism couples the first and second pivot flanges together for selectively changing spacing between the first and second pivot flanges for pivoting the pivotable element relative to the base. In one embodiment, the laser desirably pivots within the laser aperture of the base during pivoting of the pivotable element. In one embodiment, the first pivot flange has an elongated slot extending in a substantially vertical direction that enables the pivot adjusting mechanism to slide freely within the elongated opening of the first pivot flange during pivoting of the pivotable element relative to said base.

In one embodiment, the rotation adjusting mechanism preferably includes a rotation adjusting screw having a shaft that couples the first rotation flange with the second rotation flange and a rotation spring overlying the shaft of the rotation adjusting screw and extending between the first and second rotation flanges. In one embodiment, the pivot adjusting mechanism preferably includes a pivot adjusting screw having a shaft that couples the first pivot flange with the second pivot flange and a pivot spring overlying the shaft of the pivot adjusting screw and extending between the first and second pivot flanges. In one embodiment, the rotation spring desirably normally urges the first and second rotation flanges away from one another and the pivot spring normally urges the first and second pivot flanges away from one another.

In one embodiment, a drill press has a head stock, a vertical column supporting the head stock, a stand supporting a lower end of the vertical column, and a table mounted on the vertical column. A laser alignment system for a drill press preferably includes a first adjustable laser assembly mounted on a first side of the head stock for projecting a first laser light on the table, and a second adjustable laser assembly mounted on a second side of the head stock for projecting a second laser light onto the table. In one embodiment, each adjustable laser assembly preferably includes a base firmly affixed to the drill press, a rotatable element rotatably mounted on the base, a pivotable element pivotally mounted on the rotatable element, a laser mounted on the pivotable element for moving simultaneously with the pivotable element, a pivot mechanism element coupled with the pivotable element for selectively pivoting the pivotable element relative to the rotatable element, and a rotation mechanism coupled with the rotatable element for selectively rotating the rotatable element relative to the base.

In one embodiment, the pivot mechanism is engageable for changing the tilt of the laser light projected on the table. In one embodiment, the rotation mechanism is engageable for changing the angle of the laser light projected on the table.

In one embodiment, a drill press having a laser alignment system desirably includes a vertical support column having a lower end and an upper end, a head stock including a rotatable spindle secured to the upper end of the vertical support column, a stand supporting the lower end of the vertical support column, and a table mounted to the vertical support column. The system preferably includes a first adjustable laser assembly mounted on a first side of the head stock for projecting a first laser light onto the table, and a second adjustable laser assembly mounted on a second side of the head stock for projecting a second laser light onto the table. In one embodiment, each adjustable laser assembly preferably includes a base firmly affixed to the drill press, a rotatable element rotatably mounted on the base, a pivotable element pivotally mounted on the rotatable element, and a laser mounted on the pivotable element. The system preferably includes a pivot mechanism coupled with the pivotable element for pivoting the pivotable element and the laser relative to the rotatable element, and a rotation mechanism coupled with the rotatable element for simultaneously rotating the rotatable element, the pivotable element, and the laser relative to the base.

In one embodiment, the pivotable element preferably has a tubular element with an upper end, a lower end, and an axial opening extending between the upper and lower ends thereof. In one embodiment, the laser is desirably received within the axial opening of the tubular element. The tubular element preferably has a pair of pivot pins projecting outwardly from opposite sides thereof that are adapted to be seated within a central opening of the rotatable element for enabling the pivotable element to pivot relative to the rotatable element. In one embodiment, the tubular element preferably has a set screw coupled therewith for securing the laser to the tubular element. The set screw is preferably accessible at an outer surface of the tubular element.

In one embodiment, the base of an adjustable laser assembly preferably includes a first rotation flange and the rotatable element includes a second rotation flange. In one embodiment, the laser alignment system preferably has a rotation adjusting mechanism coupling the first and second rotation flanges together for selectively changing spacing between the first and second rotation flanges for rotating the rotatable element relative to the base. In one embodiment, the pivotable element preferably includes a first pivot flange and the rotatable element includes a second pivot flange. The laser alignment system may also include a pivot adjusting mechanism coupling the first and second pivot flanges for selectively changing spacing between the first and second pivot flanges for pivoting the pivotable element relative to the rotatable element and the base.

In one embodiment, the second rotation flange has an elongated opening extending in a substantially horizontal direction whereby the rotation adjusting screw is free to slide within the elongated opening of the second rotation flange. In one embodiment, the first pivot flange has an elongated opening extending in a substantially vertical direction, whereby pivot adjusting screw is free to slide within the elongated opening of the first pivot flange.

In one embodiment, the rotation adjusting mechanism preferably includes a rotation adjusting screw having a shaft that couples the first rotation flange with the second rotation flange and a rotation spring overlying the shaft of the rotation adjusting screw. In one embodiment, the rotation spring preferably extends between the first and second rotation flanges for urging the first and second rotation flanges away from one another. In one embodiment, the pivot adjusting mechanism desirably includes a pivot adjusting screw having a shaft that couples the first pivot flange with the second pivot flange and a pivot spring overlying the shaft of the pivot adjusting screw. In one embodiment, the pivot spring preferably extends between the first and second pivot flanges for urging the first and second pivot flanges away from one another.

In one embodiment, an adjustable laser assembly mountable on a drill press includes a base firmly affixed to the drill press, a rotatable element mounted on the base and being adapted to selectively rotate relative to the base, a pivotable element mounted on the rotatable element and being adapted to selectively pivot relative to the rotatable element, a laser mounted on the pivotable element and being adapted to move simultaneously with the pivotable element, a pivot adjusting mechanism coupled with the pivotable element for selectively pivoting the pivotable element relative to the rotatable element, and a rotation adjusting mechanism coupled with the rotatable element for selectively rotating the rotatable element relative to the base.

These and other preferred embodiments of the present invention will be described in more detail below.

DETAILED DESCRIPTION

Figure 1:
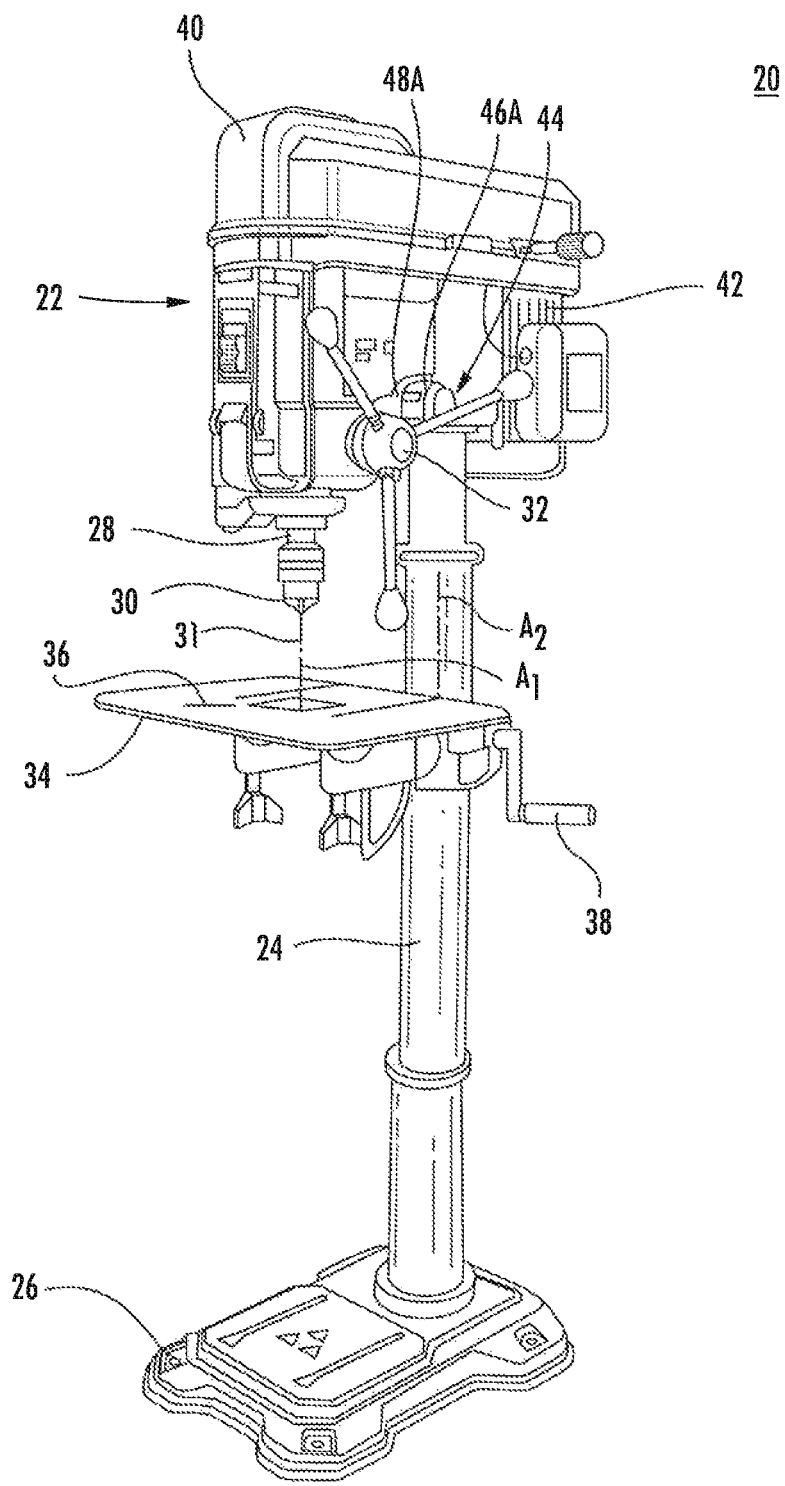
FIG. 1 shows a perspective view of a drill press having a laser alignment system, in accordance with one embodiment of the present invention.

Referring to an exemplary embodiment illustrated in FIG. 1, a drill press 20 for drilling holes in work pieces preferably includes a head stock 22 supported atop a vertically-extending support column 24 and a stand 26 supporting a lower end of the support column. The drill press 20 desirably includes a rotatable spindle 28 projecting from a lower end of the head stock 22 and a chuck 30 mountable to a lower end of the spindle. The chuck 30 is preferably adapted to receive a drill bit 31 used for drilling holes in work pieces. The drill press desirably includes a rotatable handle 32 that may be engaged by an operator for lowering the rotatable spindle 28, the chuck 30, and the drill bit 31 along a vertical axis $A_1$ that is parallel with the vertically-extending, longitudinal axis $A_2$ of the support column 24. The drill press 20 also preferably includes a table 34 having a top surface 36 adapted to support work pieces below the spindle 28, the chuck 30, and the drill bit 31. The drill press 20 preferably includes a table handle 38 that may be operated for raising and lowering the table 34 using a rack and pinion arrangement. In one embodiment, the table 34 may be rotated about the longitudinal axis $A_2$ of the support column 24, or placed at a non-perpendicular angle relative to the longitudinal axis of the support column.

The head stock 22 preferably includes a cover 40 that contains a drive system for supplying power to the spindle 28. In one embodiment, the drive system preferably includes a motor 42 that is coupled with the spindle 28 via pulleys and drive belts. The cover 40 for the head stock 22 is desirably movable between the closed position shown in FIG. 1 and an open position for accessing the drive belts and rotatable pulleys located between the motor 42 and the spindle 28. In one embodiment, the pulleys are stepped pulleys. In one embodiment, the positions of the drive belts on the stepped pulleys may be changed for modifying the speed of the drill press.

In the exemplary embodiment, the drill press preferably includes a laser alignment system 44 adapted to project laser light onto the top surface 36 of the table 34 for aligning work pieces with the spindle 28, the chuck 30 and the drill bit 31. In one embodiment, the laser alignment system 44 desirably includes a pair of adjustable laser assemblies 46 (only one adjustable laser assembly is shown in FIG. 1), whereby a first adjustable laser assembly 46A is mounted on a first side wall 48A of the head stock 22 and a second adjustable laser assembly (not shown) is mounted on a second side wall of the head stock 22.

In one embodiment, each of the two adjustable laser assemblies preferably projects laser light onto the top surface 36 of the table 34. In one embodiment, the laser light is projected as lines on the top surface 36 of the table 34. In one embodiment, the tilt and angle of the projected lines of laser light may be adjusted so that the light is perpendicular to the top surface of the table and so that the lines intersect one another at a target location on the table 34 designated as X in FIG. 1. The laser alignment system preferably enables operators to confirm that work pieces overlying the top surface 36 of the table 34 are properly aligned with the lower end of the spindle 28, the chuck 30, and the drill bit 31 so that properly located, aligned and oriented holes may be drilled in work pieces.

Figure 2:
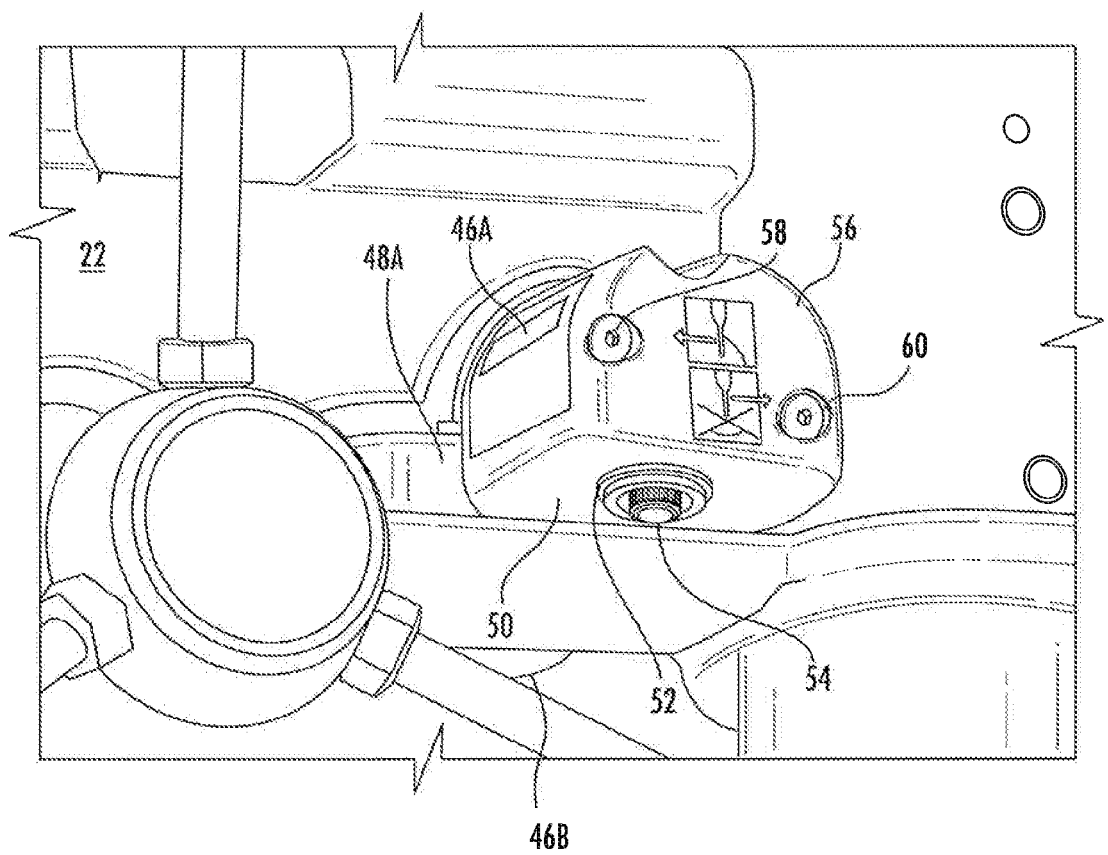
FIG. 2 shows a side view of one of the adjustable laser assemblies of the laser alignment system of FIG. 1.

Referring to an exemplary embodiment illustrated in FIG. 2, the laser alignment system 44 desirably includes a first adjustable laser assembly 46A secured to the first side wall 48A of the head stock 22 and a second adjustable laser assembly 46B secured to a second side wall (not shown) of the head stock 22. The first adjustable laser assembly 46A includes a base 50 that is mounted to the first side wall 48A of the head stock 22. The base 50 desirably includes a laser aperture 52 adapted to receive a lower end of a laser 54. The adjustable laser assembly 46A includes a laser cover 56 that is secureable over the base 50 for covering the internal components of the adjustable laser assembly 46A. The laser cover 56 may be removed, if necessary, for accessing the components positioned atop the base 50. The laser cover 56 preferably includes a first opening 58 for accessing a mechanism for making tilt adjustments to the laser 54 and a second opening 60 for accessing a second mechanism for making cross-hair adjustments to the laser 54.

Figure 3:
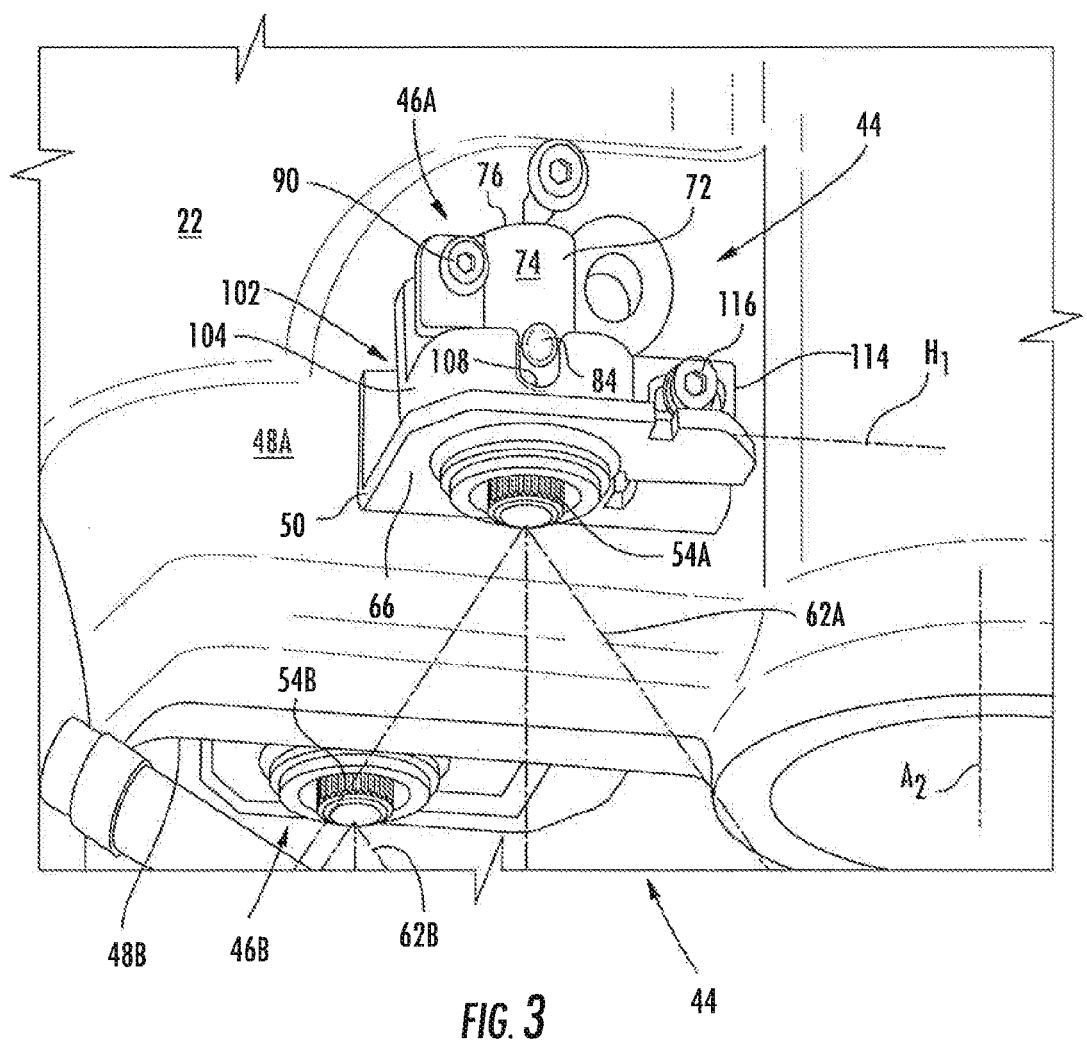
FIG. 3 shows a laser alignment system for a drill press including a pair of adjustable laser assemblies, in accordance with one embodiment of the present invention.

Referring to the exemplary embodiment illustrated in FIG. 3, the laser cover 56 shown in FIG. 2 has been removed from the first adjustable laser 46A assembly so as to clearly show the internal components of the first adjustable laser assembly. The first adjustable laser assembly 46A includes a first laser 54A that projects a first line of laser light 62A onto the top surface 36 of the table 34 (FIG. 1). The second adjustable laser assembly 46B includes a second laser 54B that projects a second line of laser light 62B onto the top surface 36 of the table 34. The positions of the first and second lasers 54A, 54B may be adjusted so that the projected lines of laser light 62A, 62B are properly oriented and aligned over the top surface 36 of the table 34, which, in turn, preferably insures that work pieces are properly aligned with the drill bit 31 (FIG. 1). When a surface (e.g. a top surface of a table or a work piece)

intersects the laser light generated by either one of the first and second lasers 54A, 54B, the laser light defines a line on the surface.

Figure 4A:
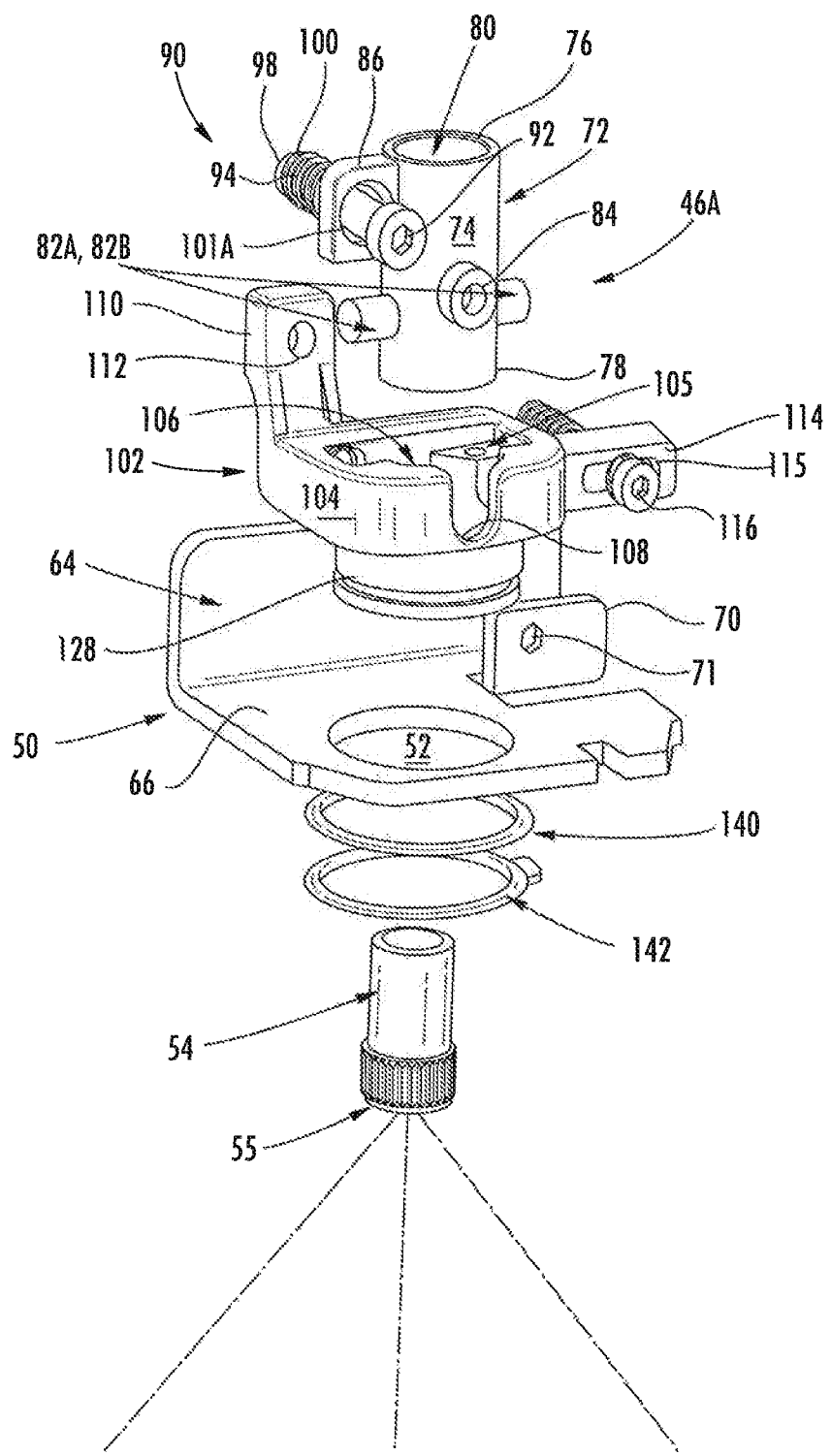
FIG. 4A shows an exploded view of one of the adjustable laser assemblies shown in FIG. 3.
Figure 4B:
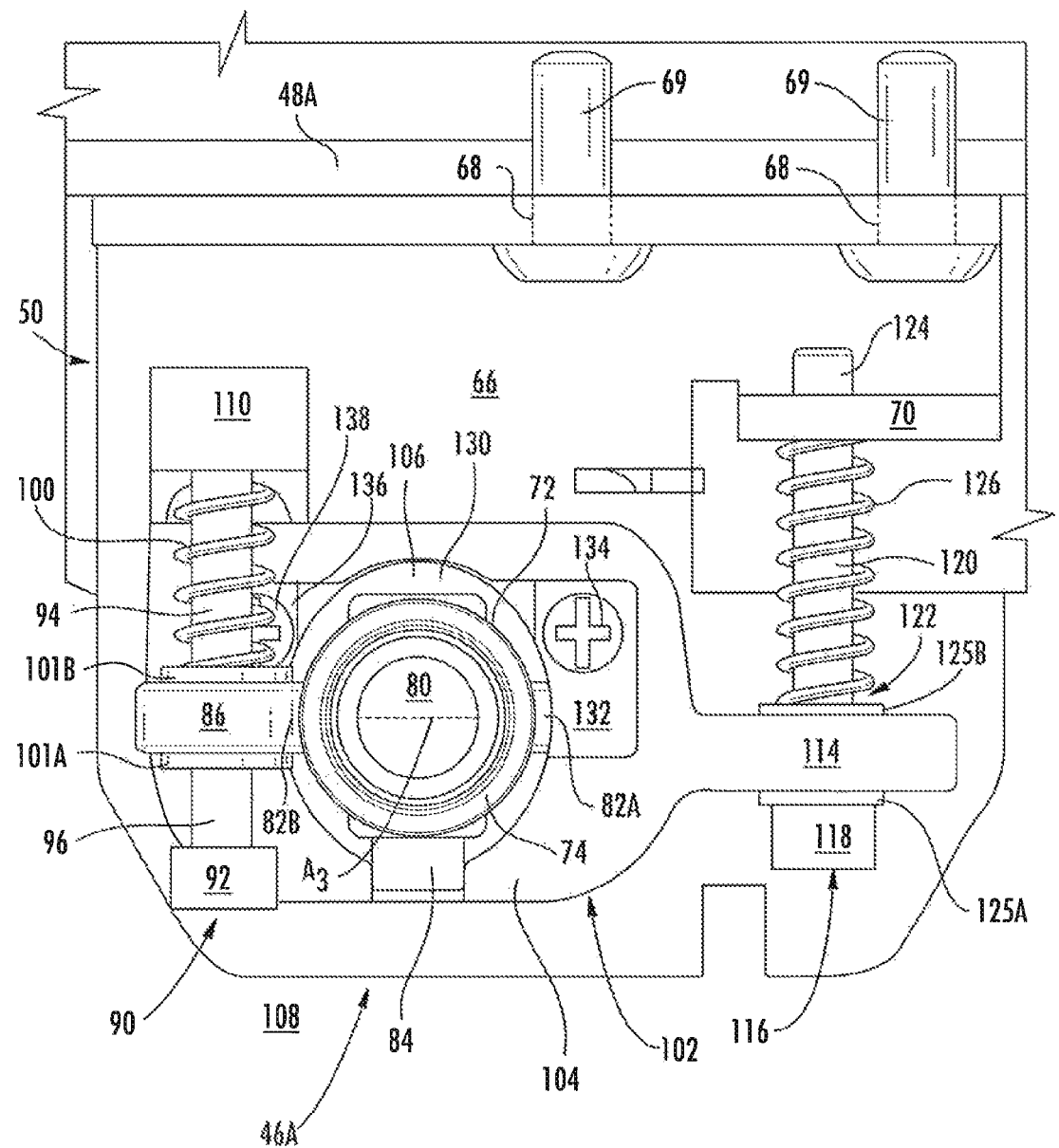
FIG. 4B shows a top plan view of one of the adjustable laser assemblies shown in FIG. 3.

Referring to the exemplary embodiment illustrated in FIGS. 4A and 4B, the cover 56 (FIG. 2) of the first adjustable laser assembly 46A has been removed for more clearly showing the internal components of the first adjustable laser assembly. FIG. 4A shows an exploded view of the first adjustable laser assembly, and FIG. 4B shows a top plan view of the first adjustable laser assembly mounted to the first side wall 48A of the head stock.

In this exemplary embodiment, the base 50 preferably includes a vertically extending flange 64 and a horizontally extending flange 66 with the laser aperture 52 extending through the horizontally extending flange. The base 50 is mountable to the first side wall 48A of the head stock 22 for securing the first adjustable laser assembly 46A to the first side of the head stock. Referring to the exemplary embodiment illustrated in FIG. 4B, the vertically extending flange 64 includes one of more base mounting openings 68 extending therethrough that are adapted to receive anchoring elements 69 for mounting and/or securing the base 50 to the first side wall 48A of the head stock 22. Once the base 50 is secured to the head stock, the base 50 desirably does not move relative to the head stock 22. The base 50 includes a first rotation flange 70 having an opening 71 extending therethrough. The opening 71 of the first rotation flange 70 is desirably adapted to receive a distal end of a rotation screw for selectively rotating a laser during an alignment process, as will be described in more detail herein.

When the base 50 is mounted to the first side wall 48A of the head stock 22, the horizontally-extending flange 66 of the base 50 preferably extends along a plane $H_1$ that is perpendicular to the longitudinal axis $A_2$ of the support column 24. The plane $H_1$ is parallel with the top surface 36 of the table 34 (FIG. 1).

Referring to the exemplary embodiment illustrated in FIGS. 4A and 4B, the first adjustable laser assembly 46A includes a pivoting element 72 having a tubular member 74 with an upper end 76, a lower end 78, and an axial opening 80 extending between the upper end lower ends 76, 78 of the tubular member 74. The laser 54 is desirably adapted for being secured in the axial opening 80 of the tubular member 74. After the laser 54 is secured in the axial opening 80 of the tubular member 74, the laser will move simultaneously with the tubular member 74 of the pivoting element 72. The tubular member 74 has a pair of pivot pins 82A, 82B that project outwardly from opposite sides of the tubular member 74 along an axis designated $A_3$. The tubular member 74 may pivot about the axis designated $A_3$. The tubular member 74 also includes a set screw 84 that projects from an outer surface of the tubular member. The set screw 84 is adapted to hold the laser 54 in place within the tubular member 74. The set screw 84 is desirably located between the pair of pivot pins 82A, 82B and may extend at an angle of approximately 90° relative to the axis $A_3$ of the pivot pins 82A, 82B.

In the exemplary embodiment, the pivoting element 72 preferably includes a first pivot flange 86 having an elongated opening 88 extending therethrough. The elongated opening 88 extends along a vertical axis that is parallel with the axis $A_2$ of the vertically-extending support column 24 (FIG. 1). The first pivot flange 86 projects from an outer surface of the tubular member 74. The first pivot flange 86 is preferably aligned with the first and second pivot pins 82A, 82B. The first pivot flange 86 is located adjacent the upper end 76 of the tubular member 74. The first pivot flange 86 is adapted to receive a pivot adjusting screw 90 for selectively pivoting the tubular member. The pivot adjusting screw 90 desirably includes a screw head 92, an elongated shaft 94 having a first end 96 secured to the screw head 92 and a second end 98 remote from the first end 96. A pivot adjusting spring 100 desirably extends over the shaft 94 of the pivot adjusting screw 90. The first and second washers 101A, 101B are located on opposite sides of the first pivot flange 86. The washers 101A, 101B prevent the adjusting screw from moving completely through the first pivot flange. The shaft 94 of the pivot adjusting screw is free to slide in the elongated opening 88 of the first pivot flange 86 and the washers 101A, 101B are free to slide along the first pivot flange 86 as pivoting adjustments are made using the pivot adjusting screw 90.

Referring to the exemplary embodiment illustrated in FIGS. 4A and 4B, the first adjustable laser assembly 46A includes a rotating element 102 adapted to be seated within the laser opening 52 extending through the horizontal flange 66 of the base 50. The rotating element 102 includes an annular ring 104 defining a central opening 106 that is adapted to seat the pivoting element 72. The inner surface of the annular ring 104 includes a pair of pivot pin seats (not shown) adapted to seat the respective pivot pins 82A, 82B projecting from the tubular member 74. The pivot pin seats enable the pivoting element 72 to pivot relative to the base 50 and the rotating element 102. In one embodiment, the pivoting element 72 is adapted for pivoting about the axis $A_3$. In one embodiment, the annular ring 104 preferably includes a notch 108 adapted to provide access to the set screw 84 projecting from the tubular member 74.

In this exemplary embodiment, the rotating element 102 also includes a second pivot adjusting flange 110 having an opening 112 extending therethrough. The second pivot adjusting flange 110 is desirably adapted to work in cooperation with the first pivot adjusting flange 86 on the pivoting element 72. When the pivoting element 72 is assembled with the rotating element 102, the shaft 94 of the pivot adjusting screw 90 passes through the first pivot adjusting flange 86, and the second end 98 of the shaft 94 of the pivot adjusting screw 90 is received within the opening 112 of the second pivot adjusting flange 110. The pivot adjusting spring 100 preferably overlies the shaft 94 of the pivot adjusting screw 90 and is desirably positioned between the first pivot adjusting flange 86 and the second pivot adjusting flange 110.

Figure 4C:
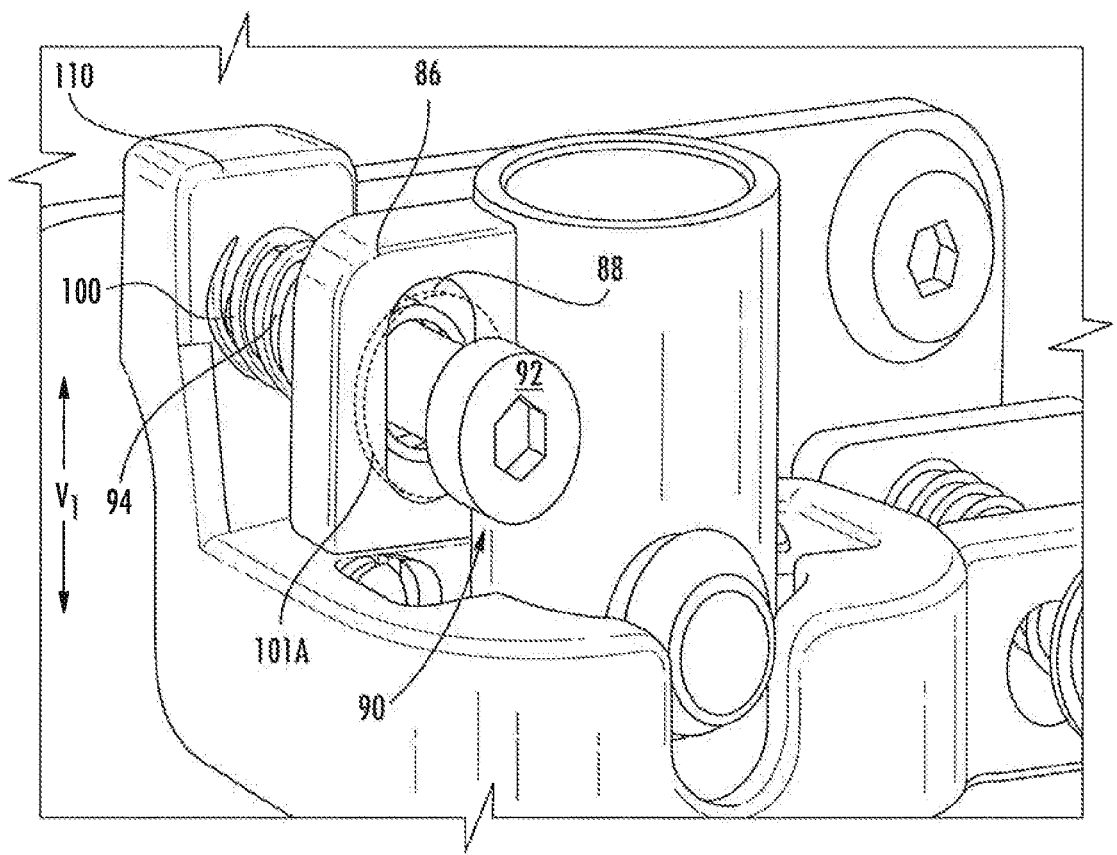
FIG. 4C shows a perspective view of a pivot adjusting mechanism for an adjustable laser, in accordance with one embodiment of the present invention.
Figure 4D:
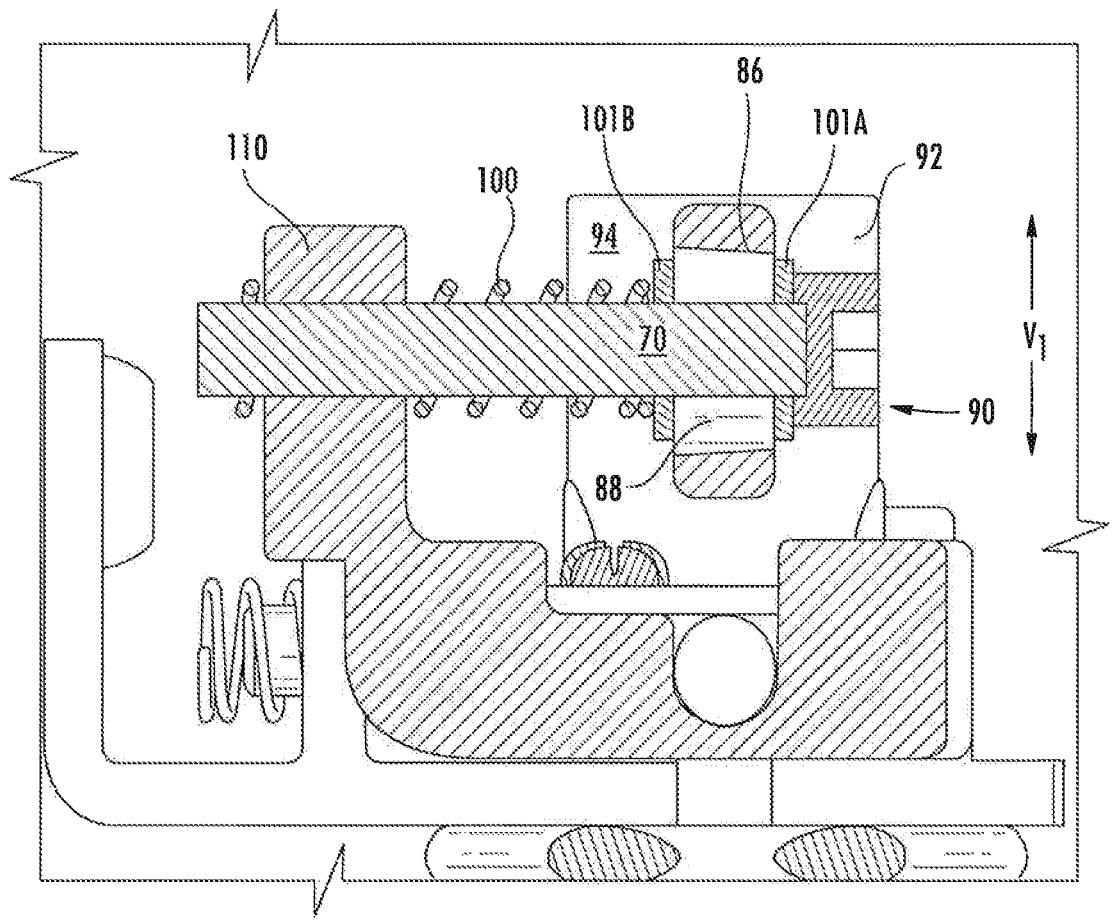
FIG. 4D shows a cross-sectional view of the pivot adjusting mechanism of FIG. 4C.
Figure 4E:
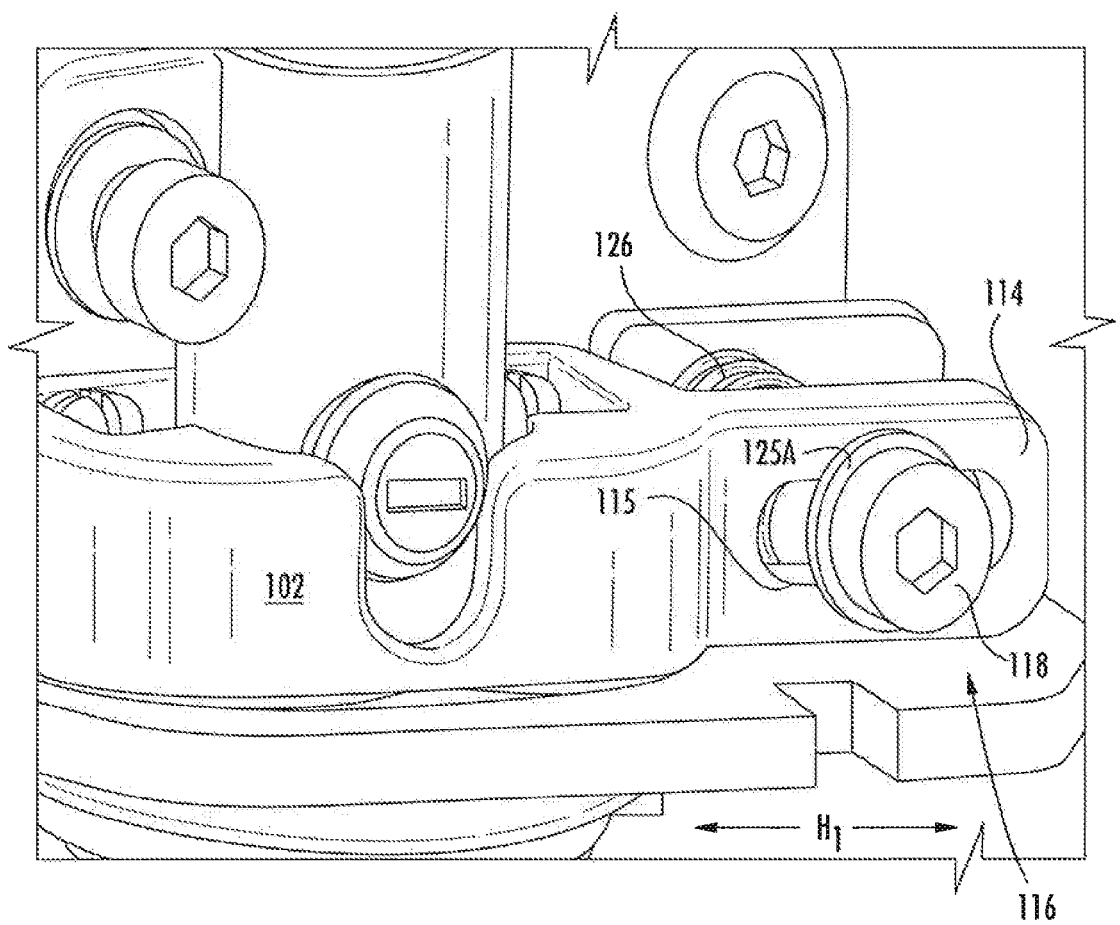
FIG. 4E shows a perspective view of a rotation adjusting mechanism for an adjustable laser assembly, in accordance with one embodiment of the present invention.
Figure 4F:
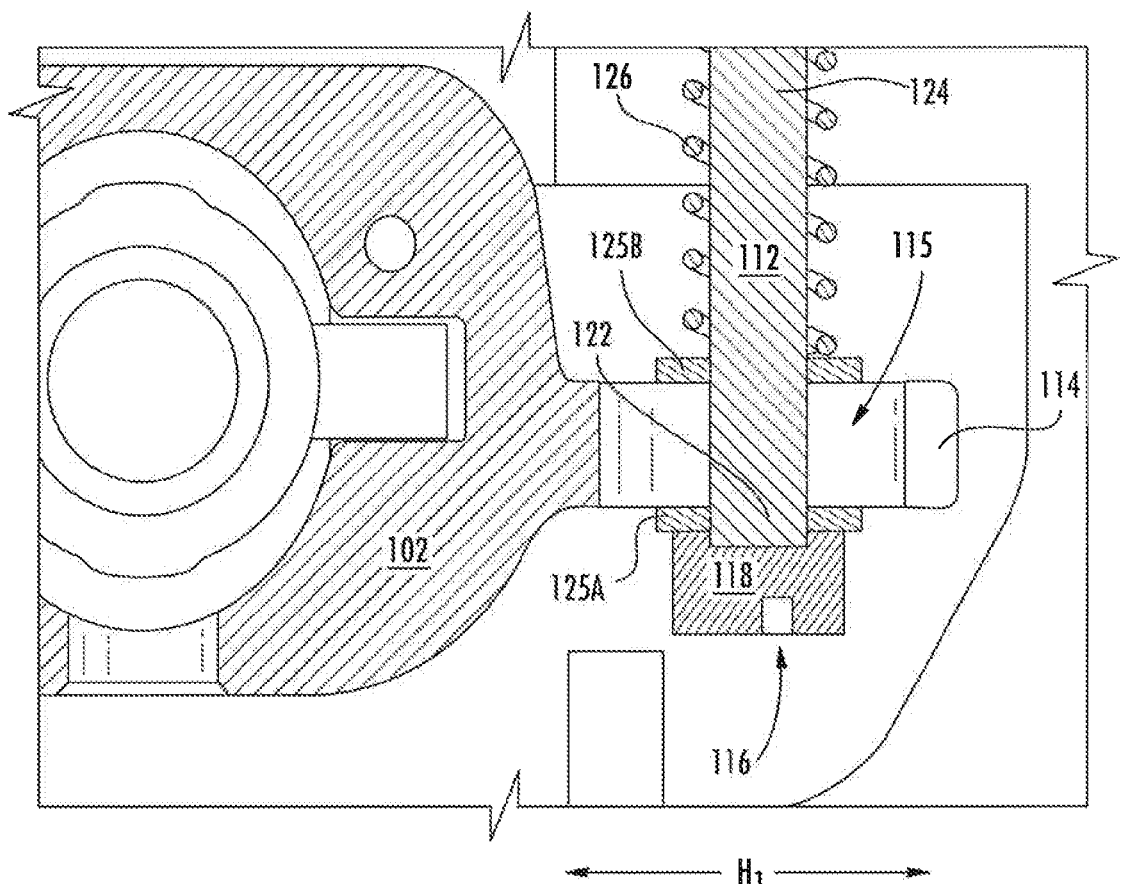
FIG. 4F shows a cross-sectional view of the rotation adjusting mechanism of FIG. 4E.

FIGS. 4C and 4D show the elongated opening 88 extending through the first pivot flange 86. The elongated opening 88 preferably extends along a vertical axis $V_1$. A first washer 101A is positioned on a first face of the first pivot flange 86 and a second washer 101B is positioned on a second face of the first pivot flange 86. The spring 100 extends between the second washer 101B and the second pivot flange 110. The washers 101A and 101B prevent the shaft 94 of the pivot adjusting screw 90 from moving through the elongated opening 88. The shaft 94 is free to slide between upper and lower ends of the elongated opening as pivot adjustments are made using the pivot adjusting screw 90. The washers 101A, 101B desirably prevent the spring 100 and the head 92 of the pivot adjusting screw 90 from becoming lodged in the elongated opening 88 as pivot adjustments are made.

Referring to the exemplary embodiment illustrated in FIGS. 4A-4B and 4E-4F, the rotating element 102 includes a second rotation flange 114 having an elongated opening 115 adapted to receive a rotation adjusting screw 116. The elongated opening 115 of the second rotating flange 114 extends along the horizontal axis $H_1$. The rotation adjusting screw 116 has a screw head 118, and a shaft 120 having a first end 122 secured to the screw head 118 and a second end 124 remote therefrom. A first washer 125A is provided on a first side of the second rotation flange 114 and a second washer 125B is provided on a second side of the second rotation flange for coupling the rotation adjusting screw 116 with the second rotation flange 114. A spring 126 overlies the shaft 120 and extends between the second washer 125B and the second rotation flange 114. The screw head 118 is free to slide between the ends of the elongated opening 115 of the second rotation flange 114 and the washers 125A, 125B are free to slide along the second rotation flange as rotating adjustments are made. The washers 125A, 125B prevent the spring 126 and the head 118 of the rotation adjusting screw 116 from becoming lodged in the elongated slot 115.

The rotating element 102 desirably includes an annular projection 128 that projects downwardly from the annular ring 104. The annular projection 128 has an axial opening 130 at the lower end thereof. The annular projection 128 preferably has an outer diameter that is smaller than the inner diameter of the laser aperture 52 on the horizontal flange 66 of the base 50 so that the annular projection may be inserted into the laser aperture 52.

In the exemplary embodiment, the first adjustable laser 46A is assembled by securing the laser 54 inside the axial opening 80 of the tubular member 74 of the pivoting element 72. The light emitting end 55 of the laser 54 faces the lower end 78 of the tubular member 74. The lower end 78 of the tubular member 74 is seated within the central opening 106 of the annular ring 104 of the rotating element 102 so that the pivot pins 82A, 82B are disposed within the pivot pin seats 105 of the annular ring 104 and the set screw is accessible within the notch 108 of the annular ring 104. The pivot screw 90 couples the first and second pivot flanges 86, 110 together, with the pivot spring 100 extending between the pivot flanges 86, 110.

Referring to the exemplary embodiment illustrated in FIG. 4B, when the pivoting element 72 is seated within the annular ring 104 of the rotating element 102, a first locking flange 132 may be positioned over the first pivot pin 82A for holding the first pivot pin 82A in the first pivot pin seat of the rotating element 102. The first locking flange 132 is held in place using a first locking screw 134. A second locking flange 136 may be positioned over the second pivot pin 82B for holding the second pivot pin 82B in the second pivot pin seat of the rotating element 102. The second locking flange 136 is held in place using a second locking screw 138.

Referring to the exemplary embodiment illustrated in FIG. 4A, after the pivoting element 72 is assembled with the rotating element 102, the subassembly is assembled with the base 50 by advancing the annular projection 128 at the lower end of the rotating element 102 through the laser aperture 52 extending through the horizontally extending flange 66 of the base 50. Referring to FIGS. 4A and 4B, the shaft 120 of the rotating screw 116 passes through the second rotation flange 114 and the second end 124 of the shaft 120 is inserted into the opening 71 of the first rotation flange 70 for coupling the first and second rotation flanges together. The rotation spring 126 extends over the shaft 120 of the rotation screw 116 and between the first and second rotation flanges 70, 114. When the subassembly including the rotating element 102, the pivoting element 72, and the laser 54 is assembled with the base 50, the light emitting end 55 of the laser 54 is accessible at the laser aperture 52 formed in the horizontally extending flange 66 of the base 50. The annular projection 128 of the rotating element 102 preferably extends through the laser aperture 52 and surrounds the lower end 55 of the laser 54. An O-ring 140 may be passed over the outer surface of the annular projection 128 of the rotating element 102 to provide a snug fit between the rotating element and the base 50. A snap ring 142 may be used to securely hold the annular projection 128 of the rotating element 102 within the laser aperture 52 of the mounted base 50. The snap ring 142 is adapted to prevent the annular ring 128 from being retracted from the laser aperture 52, however, the snap ring 142 enables the annular projection 128 to rotate freely within the laser aperture 52.

Referring to FIGS. 3 and 4B, the pivot screw 90 may be engaged for making tilt adjustments to the first adjustable laser 46A. The pivot screw 90 is rotated in a counterclockwise direction for pivoting the upper end 76 of the tubular member 74 away from the first side wall 48A of the head stock 22, and in a clockwise direction for pivoting the upper end 76 of the tubular member 74 toward the first side wall 48A of the head stock 22. As the pivoting element 72 pivots, the set screw 84 is desirably free to move between upper and lower ends of the notch 108 of the annular ring 104 of the rotating element 102. As the tilt adjustments are made to the pivoting element 72, the pivot spring 100 desirably eliminates unwanted movement of the first and second pivot flanges 86, 110 relative to one another. The pivot spring 100 acts as a damper to dampen unwanted and/or undesirable movement.

The rotation screw 116 may be engaged for making crosshair or rotating adjustments to the first adjustable laser 46A. The rotation screw 116 is rotated in a counterclockwise direction for rotating the second rotation flange 114 away from the first side wall 48A of the head stock 22, and in a clockwise direction for rotating the second rotation flange 114 toward the first side wall 48A of the head stock 22. As the rotating adjustments are made to the rotating element 102, the rotation spring 126 preferably serves as a damper for eliminating unwanted movement between the first and second rotation flanges 70, 114 relative to one another.

Figures 5A, 5B, 5C:
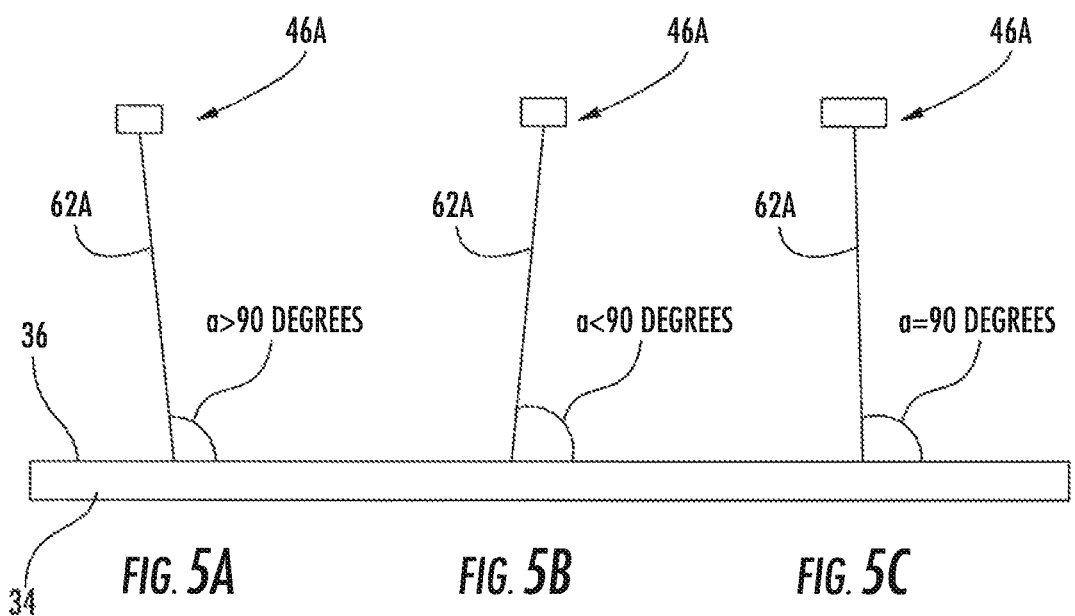
FIGS. 5A-5C show a method of adjusting the tilt of light generated by an adjustable laser assembly, in accordance with one embodiment of the present invention.

Referring to FIGS. 4B and 5A-5C, the first adjustable laser 46A projects light 62A onto the top surface 36 of the table 34. In FIG. 5A, the laser light 62A defines a line that forms an outer angle of greater than 90° with the top surface 36 of the table. In order to change the tilt of the light 62A so that it forms a 90 degree angle as shown in FIG. 5C, the pivoting screw 90 is rotated in a clockwise direction for pivoting the upper end 76 of the pivoting element 72 (FIG. 3) toward the head stock. In FIG. 5B, the laser light 62A defines a line that forms an angle of less than 90° with the top surface 36 of the table. In order to change the tilt of the light 62A so that it forms a 90 degree angle as shown in FIG. 5C, the pivoting screw 90 is rotated in a counter-clockwise direction for pivoting the upper end 76 of the pivoting element 72 (FIG. 3) away from the head stock. The preferred angle that the laser light should form with the top surface of the table 34 is 90° as shown in FIG. 5C.

Figures 6A, 6B, 6C:
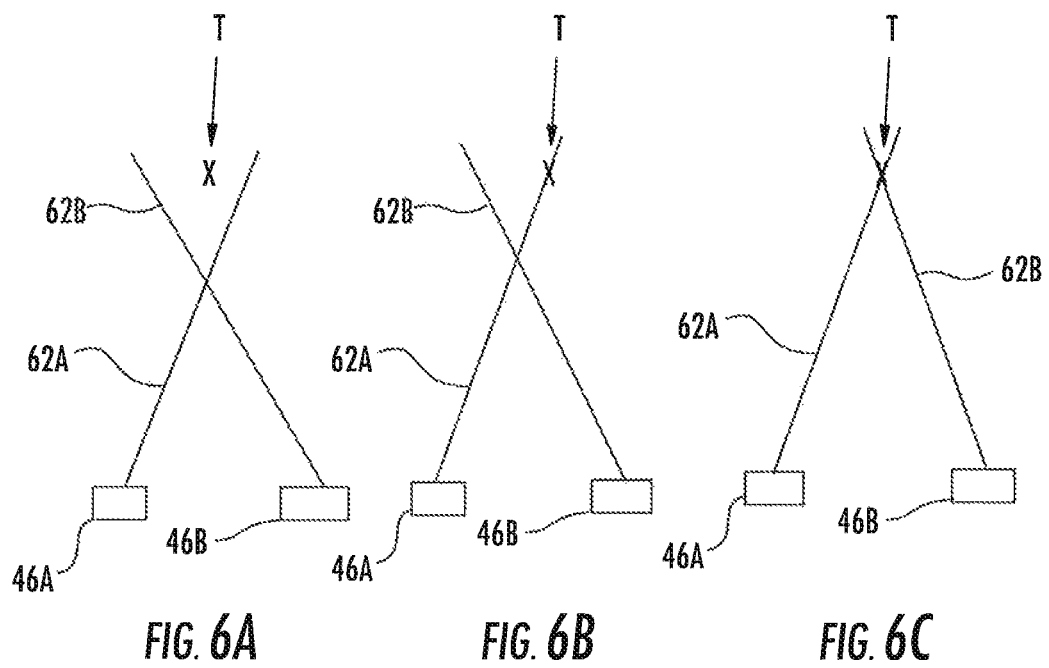
FIGS. 6A-6C show a method of aligning light generated by two different adjustable laser assemblies, in accordance with one embodiment of the present invention.

Referring to the exemplary embodiment illustrated in FIGS. 6A-6C, the first and second adjustable laser assemblies 46A, 46B may be rotated independently of one another so that the two laser lines 62A, 62B intersect at a target X located on the top surface of the table or on a work piece placed atop the table. In FIG. 6A, both the first and second adjustable laser assemblies 46A, 46B project laser lines that miss the target X. In FIG. 6B, the first adjustable laser assembly 46A is rotated to the right so that the first laser line 62A intersects the target X. At this stage, the second laser line 62B is not aligned with the target X. In FIG. 6C, the second adjustable laser assembly 46B is rotated to the left so that the second laser line 62B intersects the target X. At this stage, both the first and second laser lines 62A, 62B intersect at the target X. During operation of the drill press, the laser lines 62A, 62B may become misaligned relative to the top surface 36 of the table 34 by tilting as shown in FIGS. 5A and 5B, or not intersecting at the target X as shown in FIGS. 6A and 6B. In response, the pivot screw 90 and the rotation screw 116 may be engaged for making pivoting and/or rotating adjustments to the first and second adjustable laser assemblies 46A, 46B (FIG. 3).

Figure 7:
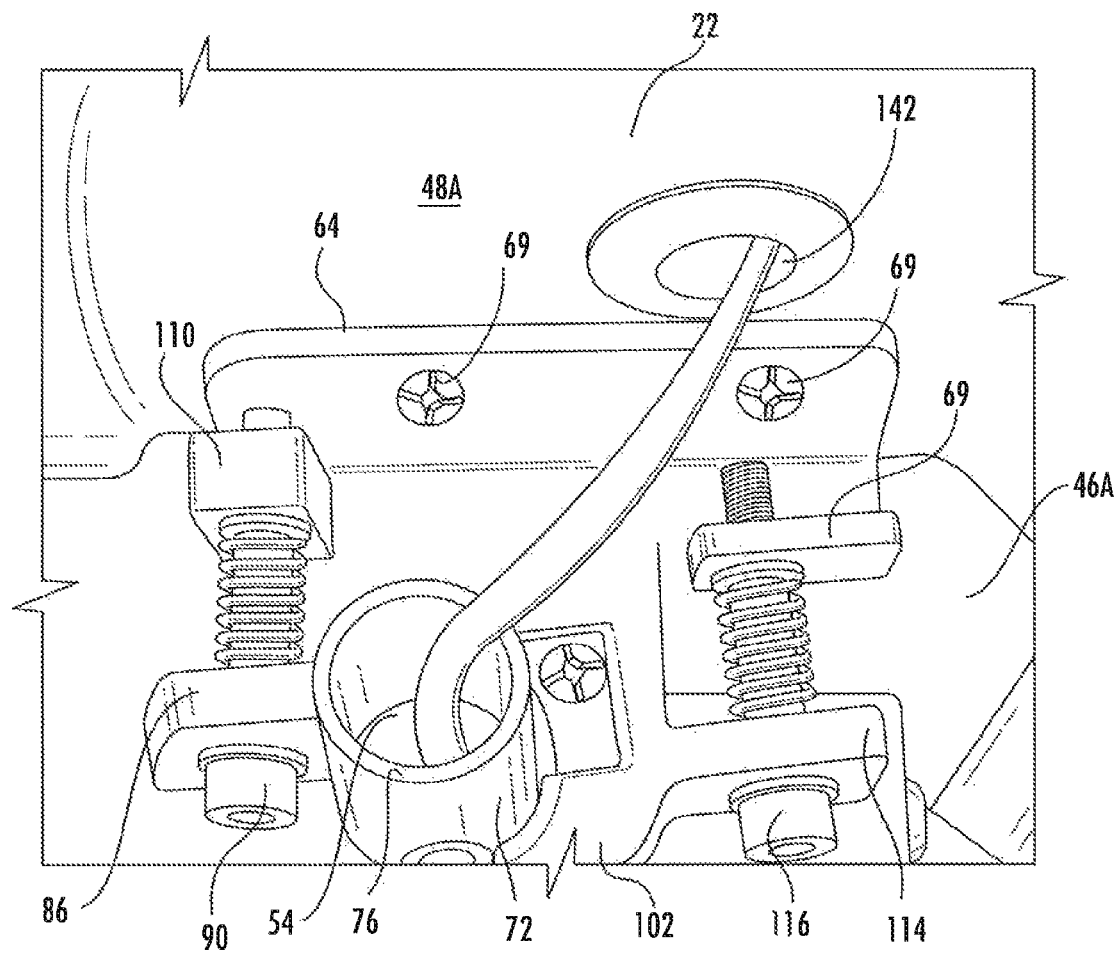
FIG. 7 shows a top plan view of an adjustable laser assembly secured to a head stock of a drill press, in accordance with one embodiment of the present invention.

Referring to the exemplary embodiment illustrated in FIG. 7, in one embodiment, the base 50 of the first adjustable laser assembly 46A is preferably mounted to the first side wall 48A of the head stock 22 by passing anchoring elements 69 through the vertically extending flange 64 of the base 50. The anchoring elements 69 may be screws that may be tightened for mounting the base 50 to the head stock 22. When the base 50 is mounted on the head stock 22, the base preferably does not move relative to the head stock. The first adjustable laser assembly 46A may include a conduit 140 that supplies electrical power and/or control signals to the laser 54 secured within the pivoting element 72. The conduit 140 may pass through an opening 142 formed in the first side wall 48A of the head stock 22. The conduit 140 may be flexible for being able to move during pivoting movement of the pivoting element 72 and rotating movement of the rotating element 102.

The pivot screw 90 is rotatable in a counterclockwise direction for moving the first pivot flange 86 on the pivoting element 72 away from the second pivot flange 110 on the rotating element 102, which, in turn, pivots the upper end 76 of the pivoting element 72 away from the side wall 48A. The pivot screw 90 is rotatable in a clockwise direction for moving the first pivot flange 86 on the pivoting element 72 toward the second pivot flange 110 on the rotating element 102 for pivoting the upper end 76 of the pivoting element 72 toward the side wall 48A. The rotation screw 116 is rotatable in a counterclockwise direction for moving the second rotation flange 114 on the rotating element 102 away from the first rotation flange 70 thereby rotating the second rotation flange 114 away from the side wall 48A. The rotation screw 116 is rotatable in a clockwise direction for moving the second rotation flange 114 on the rotating element 102 toward the first rotation flange 70 thereby rotating the second rotation flange 114 toward the first side wall 48A.

Figure 8:
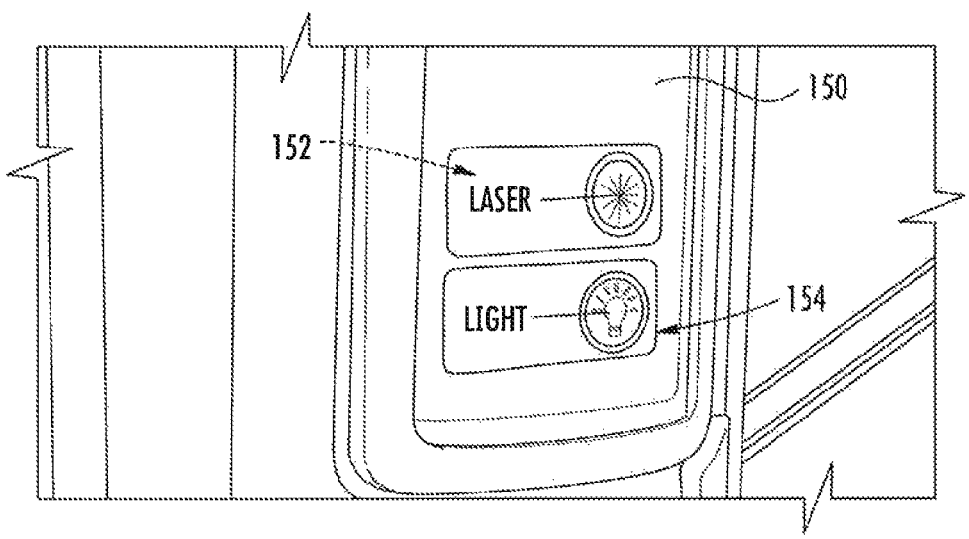
FIG. 8 shows a control panel for activating a laser alignment system, in accordance with one embodiment of the present invention.

Referring to the exemplary embodiment illustrated in FIG. 8, the head stock 22 preferably includes a control panel 150 having a laser button 152 that may be pressed for turning ON and turning OFF the lasers of the first and second adjustable lasers 46A, 46B (FIG. 3). The control panel 150 also includes a light button 154 that may be pressed for turning ON and turning OFF a work light adapted to illuminate the work area over the top surface 36 of the table 34 (FIG. 1).

Figure 9A:
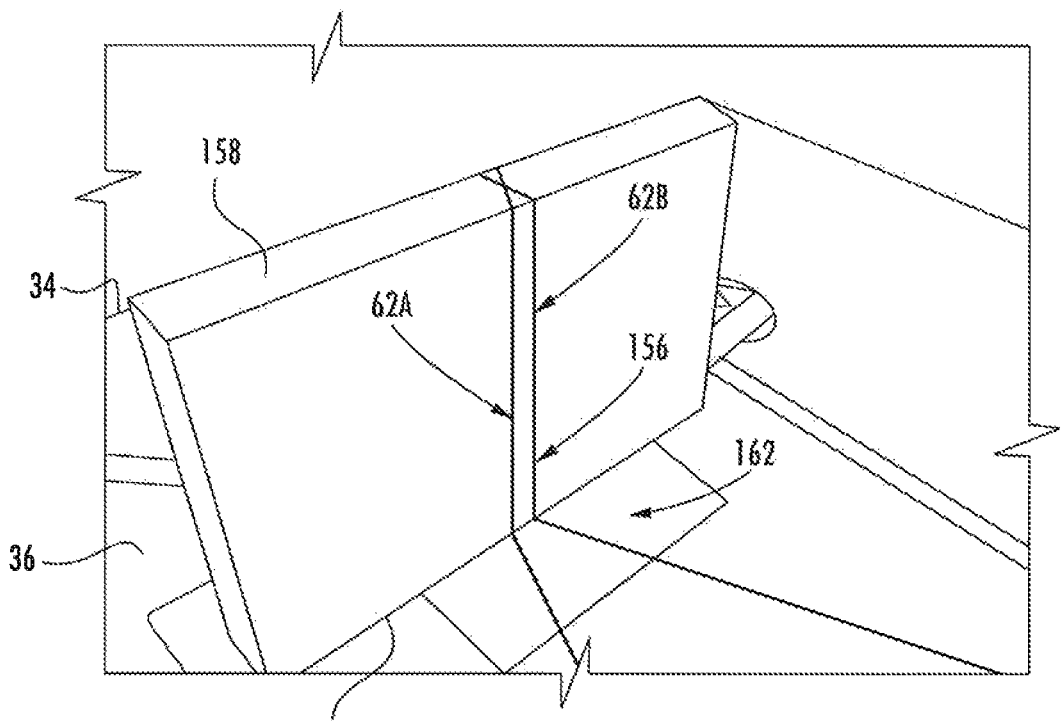
FIG. 9A-9D show a method of using a laser alignment system for a drill press, in accordance with one embodiment of the present invention.
Figure 9B:
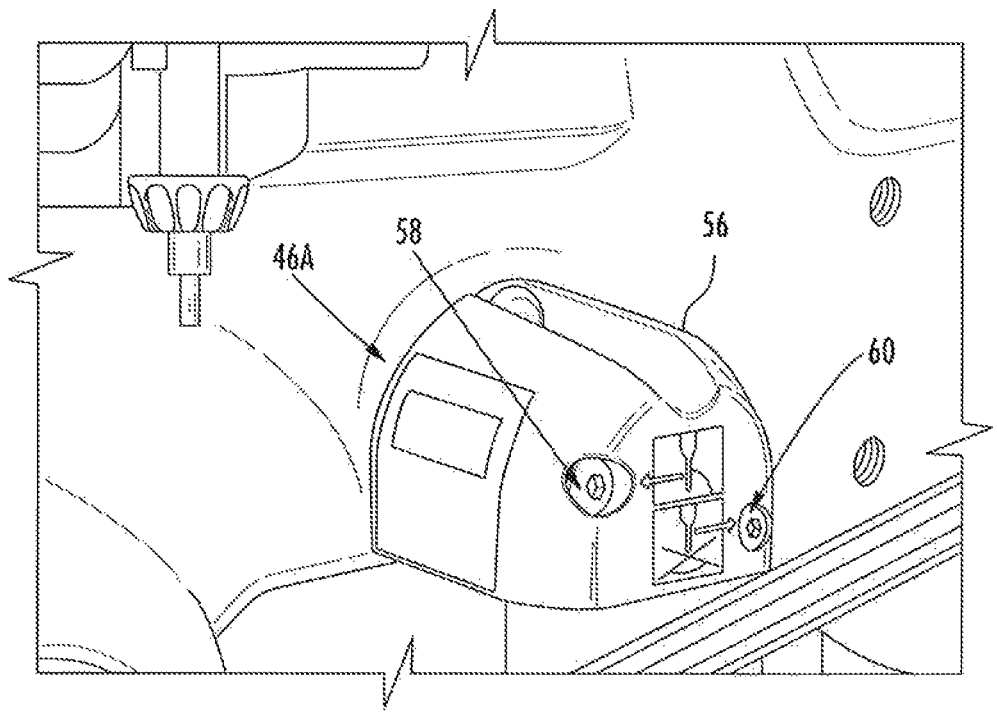
Figure 9C:
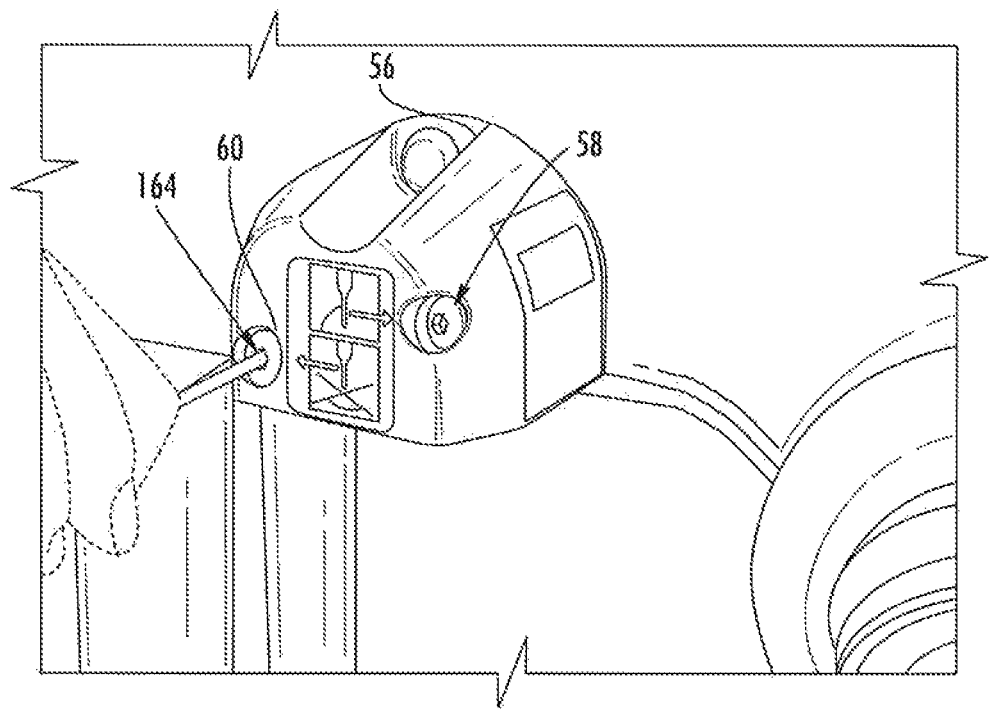

Referring to the exemplary embodiment illustrated in FIG. 9A, an operator may use the laser alignment system disclosed herein to determine whether the laser lines 62A, 62B projecting from the first and second adjustable lasers 46A, 46B (FIG. 3) are perpendicular to the top surface 36 of the table 34. In one embodiment, a straight line 156 is drawn on a scrap board 158. A lower edge 160 of the scrap board 158 is placed on the top surface 36 of the table 34 with the drawn line 156 facing the back of the drill press. The scrap board 158 is placed over a middle of a table insert 162. The laser button 152 (FIG. 8) may be pushed for turning the first and second adjustable lasers ON and projecting the respective first and second laser lines 62A, 62B onto the scrap board 158. The operator confirms whether the first and second laser lines 62A, 62B are parallel with the vertically-extending drawn line 156. Referring to FIG. 9A, if the first and second laser lines 62A, 62B are parallel to the drawn line 156, no pivoting adjustment is necessary. Referring to FIGS. 9A-9C, if the first laser line 62A is not parallel to the drawn line 156, an operator preferably inserts a tool 164, such as a hex key or an L-shaped wrench, into the first opening 58 in the laser cover 56 of the first adjustable laser and rotates the pivot screw 90 (FIG. 3) in a counterclockwise or clockwise direction, as required, until the first laser line 62A is parallel with the drawn line 156. The operator preferably takes the same action for adjusting the second laser line 62B projected by the second adjustable laser 46B (FIG. 3) to ensure that that the second laser line is parallel with the drawn line 156.

Figure 9D:
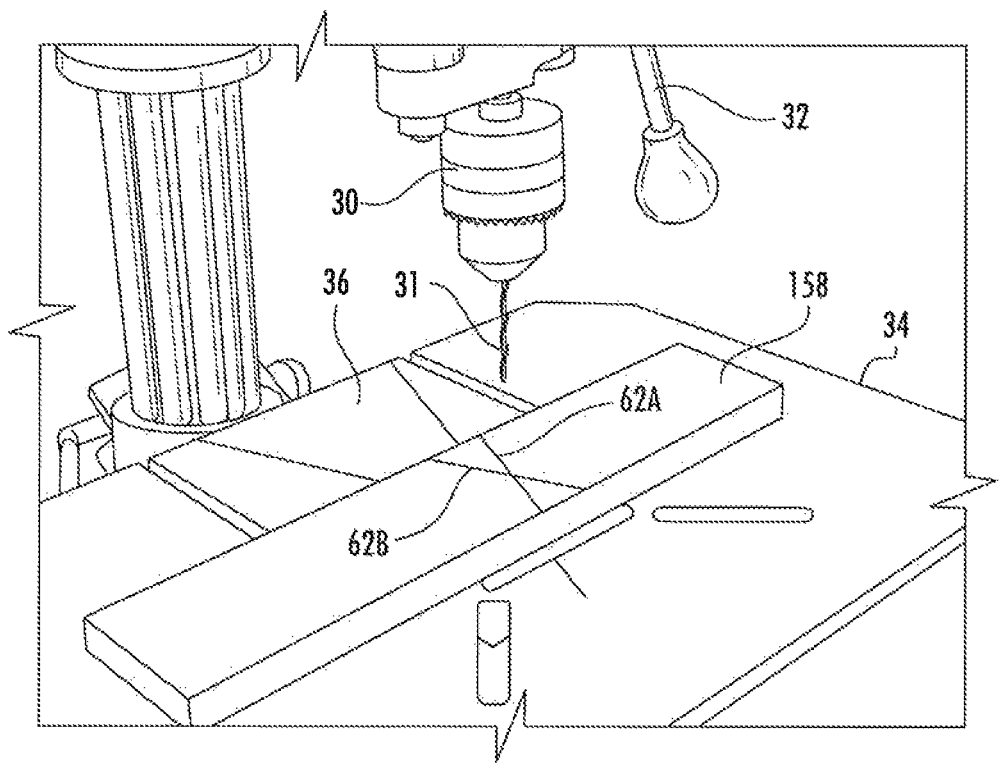

After an operator ensures that the first and second laser lines are parallel to the drawn line on the scrap board, the operator must confirm that the first and second laser lines intersect one another at a target location on the tabletop or on a work piece. Referring to FIGS. 9B-9D, a scrap board 158 is placed flat on the top surface 36 of the table 34, and held in place so that it does not move. With the power OFF, a drill bit 31 is secured in the chuck 30. The handle 32 is engaged for lowering the drill bit 31 toward the scrap board 158 to make an impression on the board. The laser button is then pressed ON to project first and second laser lines 62A, 62B onto the scrap board. If the two laser lines 62A, 62B intersect at the impression formed in the scrap board 158, then no rotational adjustment of the lasers is required. If one of the laser lines 62A, 62B does not intersect the impression on the board, then the tool 164 is inserted into the second opening 60 in the laser cover 56 to rotate that particular laser as necessary. In one preferred embodiment, the first and second adjustable lasers 46A, 46B are adjusted until the two laser lines 62A, 62B intersect one another at the impression formed on the scrap board, as shown in FIG. 9D.

Although the present invention is not limited by any particular theory of operation, the present invention provides a laser alignment system for a drill press having spring loaded screw driven adjusters on both axis of the lasers so that there is no locking screw to loosen or tighten. The user merely turns the adjustment screw in which ever direction is needed to adjust the laser. The pitch of the screws allows for a much finer adjustment than may be obtained by hand or even when using direct tool adjustments. The adjustment screws have springs coupled therewith that provide tension on the mechanism at all times to reduce any backlash from the threads of the screw. In one embodiment, a tilt adjustment is integrated into a cross-hair adjustment, so that once the user has the tilt adjustment line perpendicular to the table 34, adjusting the cross-hair to line it up with the drill bit will not disturb the drill setting. The present invention provides a dramatic improvement over prior art laser alignment devices that force an operator to cycle back and forth until perfect alignment is achieved since moving one of the variables often causes the other variable to become misaligned. Thus, the present invention provides for a quick and easy way to align lasers and no longer requires a super steady hand and enormous amounts of patience. In addition, the adjustments are separated into a tilt or pivoting adjustment and a cross-hair or rotating adjustment. In one embodiment, the tilt or pivot adjuster is located inside the cross-hair or rotation adjuster, which makes for easier set up and alignment.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A laser alignment system comprising:
   first and second adjustable laser assemblies mountable on a drill press;
   each said adjustable laser assembly comprising
      a base firmly affixed to said drill press,
      a rotatable element mounted on said base and being adapted to selectively rotate relative to said base,
      a pivotable element mounted on said rotatable element and being adapted to selectively pivot relative to said rotatable element,
      a laser mounted on said pivotable element and being adapted to move simultaneously with said pivotable element,
      a pivot adjusting mechanism coupled with said pivotable element for selectively pivoting said pivotable element relative to said rotatable element, and
      a rotation adjusting mechanism coupled with said rotatable element for selectively rotating said rotatable element relative to said base.

2. The laser alignment system as claimed in claim 1, wherein said pivotable element is adapted to pivot relative to said rotatable element and rotate simultaneously with said rotatable element.

3. The laser alignment system as claimed in claim 2, wherein said laser is adapted to pivot as said pivotable element pivots relative to said rotatable element and rotate as said rotatable element rotates relative to said base.

4. The laser alignment system as claimed in claim 1, wherein said first adjustable laser assembly is mounted to a first side of a headstock for projecting a first laser light onto a table and said second adjustable laser assembly is mounted to a second side of said headstock for projecting a second laser light onto said table.

5. The laser alignment system as claimed in claim 4, wherein each said adjustable laser assembly comprises:
   a base secured to one of said sides of said headstock, said base including a horizontal flange that lies in a plane that is perpendicular to a longitudinal axis of said vertical support column;
   said horizontal flange having a laser aperture extending therethrough, wherein said rotatable element, said pivotable element, and said laser are aligned with said laser aperture.

6. The laser alignment system as claimed in claim 5, wherein said base includes a first rotation flange and said rotatable element includes a second rotation flange, and wherein said rotation adjusting mechanism couples said first and second rotation flanges together for selectively changing spacing between said first and second rotation flanges for rotating said rotatable element relative to said base.

7. The laser alignment system as claimed in claim 6, wherein said second rotation flange has an elongated opening extending in a substantially horizontal direction that enables said rotation adjusting mechanism to slide freely within said elongated opening during rotation of said rotatable element relative to said base.

8. The laser alignment system as claimed in claim 6, wherein said laser rotates within said laser aperture of said base during rotation of said rotatable element.

9. The laser alignment system as claimed in claim 6, wherein said pivotable element comprises a first pivot flange and said rotatable element comprises a second pivot flange, and wherein said pivot adjusting mechanism couples said first and second pivot flanges together for selectively changing spacing between said first and second pivot flanges for pivoting said pivotable element relative to said base.

10. The laser alignment system as claimed in claim 8, wherein said first pivot flange has an elongated slot extending in a substantially vertical direction that enables said pivot adjusting mechanism to slide freely within said elongated opening of said first pivot flange during pivoting of said pivotable element relative to said base.

11. The laser alignment system as claimed in claim 9, wherein said laser pivots within said laser aperture of said base during pivoting of said pivotable element.

12. The laser alignment system as claimed in claim 9, wherein said rotation adjusting mechanism comprises a rotation adjusting screw having a shaft that couples said first rotation flange with said second rotation flange and a rotation spring overlying said shaft of said rotation adjusting screw and extending between said first and second rotation flanges.

13. The laser alignment system as claimed in claim 12, wherein said pivot adjusting mechanism comprises a pivot adjusting screw having a shaft that couples said first pivot flange with said second pivot flange and a pivot spring overlying said shaft of said pivot adjusting screw and extending between said first and second pivot flanges.

14. The laser alignment system as claimed in claim 13, wherein said rotation spring normally urges said first and second rotation flanges away from one another and said pivot spring normally urges said first and second pivot flanges away from one another.

15. A laser alignment system for a drill press having a head stock, a vertical column supporting said head stock, a stand supporting a lower end of said vertical column, and a table mounted on said vertical column, said laser alignment system comprising:
   a first adjustable laser assembly mounted on a first side of said head stock for projecting a first laser light on said table;
   a second adjustable laser assembly mounted on a second side of said head stock for projecting a second laser light on said table;
   each said adjustable laser assembly comprising
      a base firmly affixed to said drill press,
      a rotatable element rotatable mounted on said base,
      a pivotable element pivotally mounted on said rotatable element,
      a laser mounted on said pivotable element for moving simultaneously with said pivotable element,
      a pivot mechanism element coupled with said pivotable element for selectively pivoting said pivotable element relative to said rotatable element, and
      a rotation mechanism coupled with said rotatable element for selectively rotating said rotatable element relative to said base.

16. The laser alignment system as claimed in claim 15, wherein said pivot mechanism is engageable for changing the tilt of said laser light projected on said table.

17. The laser alignment system as claimed in claim 15, wherein said rotation mechanism is engageable for changing the angle of said laser light projected on said table.

18. A drill press having a laser alignment system comprising:
   a vertical support column having a lower end and an upper end;
   a head stock including a rotatable spindle secured to said upper end of said vertical support column;
   a stand supporting said lower end of said vertical support column;
   a table mounted to said vertical support column;

a first adjustable laser assembly mounted on a first side of said head stock for projecting a first laser light onto said table;

a second adjustable laser assembly mounted on a second side of said head stock for projecting a second laser light onto said table;

each said adjustable laser assembly comprising
- a base firmly affixed to said drill press,
- a rotatable element rotatably mounted on said base,
- a pivotable element pivotally mounted on said rotatable element,
- a laser mounted on said pivotable element,
- a pivot mechanism element coupled with said pivotable element for pivoting said pivotable element and said laser relative to said rotatable element, and
- a rotation mechanism coupled with said rotatable element for simultaneously rotating said rotatable element, said pivotable element, and said laser relative to said base.

19. The drill press as claimed in claim 18, wherein said pivotable element comprises a tubular element having an upper end, a lower end, and an axial opening extending between said upper and lower ends thereof, said laser being received within said axial opening of said tubular element, said tubular element having a pair of pivot pins projecting outwardly from opposite sides thereof that are adapted to be seated within a central opening of said rotatable element for enabling said pivotable element to pivot relative to said rotatable element, and said tubular element having a set screw projecting outwardly therefrom and being engageable for securing said laser to said tubular element.

20. The drill press as claimed in claim 18, wherein said base includes a first rotation flange and said rotatable element includes a second rotation flange, said laser alignment system further comprising a rotation adjusting mechanism coupling said first and second rotation flanges together for selectively changing spacing between said first and second rotation flanges for rotating said rotatable element relative to said base, and wherein said pivotable element comprises a first pivot flange and said rotatable element comprises a second pivot flange, said laser alignment system further comprising a pivot adjusting mechanism coupling said first and second pivot flanges for selectively changing spacing between said first and second pivot flanges for pivoting said pivotable element relative to said rotatable element and said base.

21. The drill press as claimed in claim 20, wherein said rotation adjusting mechanism comprises a rotation adjusting screw having a shaft that couples said first rotation flange with said second rotation flange and a rotation spring overlying said shaft of said rotation adjusting screw, said rotation spring extending between said first and second rotation flanges for urging said first and second rotation flanges away from one another, and wherein said pivot adjusting mechanism comprises a pivot adjusting screw having a shaft that couples said first pivot flange with said second pivot flange and a pivot spring overlying said shaft of said pivot adjusting screw, said pivot spring extending between said first and second pivot flanges for urging said first and second pivot flanges away from one another.

22. The drill press as claimed in claim 21, wherein said second rotation flange has an elongated opening extending in a substantially horizontal direction, said rotation adjusting screw being free to slide within said elongated opening of said second rotation flange, and wherein said first pivot flange has an elongated opening extending in a substantially vertical direction, said pivot adjusting screw being free to slide within said elongated opening of said first pivot flange.

23. An adjustable laser assembly mountable on a drill press, the adjustable laser assembly comprising:
- a base firmly affixed to said drill press;
- a rotatable element mounted on said base and being adapted to selectively rotate relative to said base;
- a pivotable element mounted on said rotatable element and being adapted to selectively pivot relative to said rotatable element;
- a laser mounted on said pivotable element and being adapted to move simultaneously with said pivotable element;
- a pivot adjusting mechanism coupled with said pivotable element for selectively pivoting said pivotable element relative to said rotatable element; and
- a rotation adjusting mechanism coupled with said rotatable element for selectively rotating said rotatable element relative to said base.

\* \* \* \* \*